United States Patent [19]

Kelley et al.

[11] Patent Number: 5,144,654
[45] Date of Patent: Sep. 1, 1992

[54] AUTOMATIC TELEPHONE DIALER SYSTEM WITH PRINTED STORAGE

[76] Inventors: James T. Kelley, 968 Kiely Blvd. #E, Santa Clara, Calif. 95051; Stephen E. Ruckman, Jr., 1660 Franky Ct., Santa Cruz, Calif. 95065

[21] Appl. No.: 673,410

[22] Filed: Mar. 22, 1991

[51] Int. Cl.⁵ .......................................... H04M 1/274
[52] U.S. Cl. .................................. 379/356; 379/355; 379/216; 379/92
[58] Field of Search ............... 379/354, 355, 356, 357, 379/216, 92

[56] References Cited

U.S. PATENT DOCUMENTS

| | | | |
|---|---|---|---|
| 4,042,792 | 8/1977 | Pakenham et al. | 379/355 |
| 4,503,288 | 3/1985 | Kessler | 179/2 DP |
| 4,654,482 | 3/1987 | De Angelis | 379/95 |
| 4,800,582 | 1/1989 | D'Agosto, III et al. | 379/355 |
| 4,817,136 | 3/1989 | Rhoads | 379/357 |
| 4,868,849 | 9/1989 | Tamaoki | 379/357 |
| 4,897,865 | 1/1990 | Canuel | 379/91 |
| 4,899,370 | 2/1990 | Kameo et al. | 379/447 |
| 4,907,264 | 3/1990 | Seiler et al. | 379/354 |
| 4,975,948 | 12/1990 | Andresen et al. | 379/355 |

FOREIGN PATENT DOCUMENTS

| | | | |
|---|---|---|---|
| 0004148 | 1/1989 | Japan | 379/357 |
| 0012653 | 1/1989 | Japan | 379/357 |
| 0042967 | 2/1989 | Japan | 379/357 |
| 0093953 | 4/1989 | Japan | 379/357 |

Primary Examiner—James L. Dwyer
Assistant Examiner—Jhancy Augustus

[57] ABSTRACT

An automatic telephone dialer system using optical input of telephone numbers from printed materials. Numbers can be stored as bar codes (22) readable by a bar code wand (26) or as characters (24) readable by an OCR (Optical Character Recognition) scanner (106). When the number is read by the autodialer unit it is interpreted by a microcontroller (50) which commands a DTMF (Dual Tone MultiFrequency) generator (56) to send dialing signals to a telephone line (72). Dialing occurs when a sensor (68) detects that an attached telephone handset (74) is off-hook. Multiple numbers can be read into memory (42) and the next sequential number will be dialed after the telephone handset goes on-hook then off-hook. The sequence of numbers can be cleared by a reset switch (30). Bar codes are self checking and require only one scan. The autodialer unit can be configured to delete all scanned area codes or access codes. The user can create phone number storage media (114) by a computer (108) and a printer (112) or a dedicated unit (116). The computer is configured to delete local area codes and add access codes when printing. The computer provides a convenient human interface for creation of media for multiple autodialer units without burdening each autodialer with additional cost, bulk and complexity. Media formats include labels (20), rotary file cards (124), and a roster (132), with a single or a plurality of numbers per piece.

20 Claims, 8 Drawing Sheets

AUTOMATIC TELEPHONE DIALER SYSTEM WITH PRINTED STORAGE

BACKGROUND

1. Field of Invention

This invention relates to telephone equipment, specifically to an improved automatic dialer.

2. Discussion of Prior Art

Traditional Autodialers

Automatic telephone dialers have been developed over the years. They generally comprise a device which stores a plurality of phone number and a means to select any number so as to cause the dialer to dial that number. Such dialers have employed a wide variety of storage media for the phone numbers. They have used punched cards, magnetic or paper tubes (and other mechanical techniques), and digital electronic memories. However these media have numerous limitations. These include difficulty of entering the phone number in the storage media; difficulty of recalling the phone number from the storage media for dialing; difficulty of duplicating the storage media (or phone number itself) for use on another automatic dialer; poor durability of the storage media; difficulty of sorting, filing and retrieving the storage media, particularly if its typical use is associated with other information; and a relatively small quantity of stored numbers.

Ease of entering, recall, and duplication of the phone numbers to the storage media can require relatively expensive mechanical equipment for punched media, magnetic tapes, and other mechanical techniques. If multiple numbers are stored on a single unit of media, mechanical access to a specific number for recall and dialing can entail a significant delay. Duplication requires a reading system and a writing system or a dual-function system with temporary storage. This requires that the original medium be inserted, read, and removed, and the (blank) copy medium be inserted, written and removed.

Systems with digital electronic memories (presently the most popular) often require complicated sequences of button pressing for entering and recall. Users who infrequently add or change phone numbers usually need to refer to their instruction manual (if they can find it). Different models rarely use the same sequence. Physical possession of the system is required for entering phone numbers, except for those rare systems that have removable memory modules. Thus the task of updating multiple systems in a home or office with new phone numbers can be very involved. They usually have no capability to copy data to a separate system. A very few units provide a download cable, but this requires simultaneous physical possession of both systems.

Durability of the storage media (and the phone number stored) is affected by a variety of factors. Punched media is sometimes fairly durable but wear can affect hole size or cause stretching. Magnetic tape is susceptible to wear, breakage, and stray magnetic fields. Digital electronic memories are subject to data loss if power is interrupted (including backup power, if any). Electro-Static discharge (ESD) and power line noise can garble phone numbers via inverted bits, false triggering, and misregistration.

Ease of sorting, filing, and retrieving the storage media can be very important, particularly if its typical use is associated with access to other information. An example is when a user is working on a task that uses forms, documents or other paperwork. This paperwork is often stored in file folders. Phone calls may be required to do the task. It is desirable to have the phone numbers filed with the paperwork.

The ease of filing depends partly of whether multiple phone numbers (each associates with a different task) are stored on the same storage medium. A one-piece storage medium (such as a reel of magnetic tape) generally can not be broken up for filing each individual phone number with its associated task. Another case is where a storage medium with multiple phone numbers on it contains a subgroup of phone numbers associated with on task. It would then be desirable to break the subgroup out as a one-piece storage medium for filing with the associated task.

Another factor is the physical characteristics of the storage medium, i.e., how easy it is to put in a file folder. Punched cards, if removable from the machine, can be filed with related information. Punched or magnetic tapes are not suitable as they are too bulky and generally have multiple numbers. Digital electronic memories are generally not removable, but even if they are then usually have multiple numbers and the storage modules are too expensive and bulky.

The maximum quantity of stored number is fixed for systems with nonremovable storage media. This may or may not be true with punched media and magnetic tape. Sorting through several reels of tape to find a number puts a limit on the quantity of numbers which may be stored. Most systems using digital electronic memory have a fixed maximum. They are useful for a limited list of "hot" telephone numbers, but generally lack a larger capacity.

Recent Developments

Recently some systems have become available which are different from the foregoing traditional automatic dialers, but can be used that way. These include personal computers, remote data collection devices, and "calling card" systems.

A personal computer with a modem and the appropriate software can be used to dial phone numbers. The phone numbers are stored on a computer disk. However, many people who need an autodialer don't have a computer next to every phone. A dedicated computer is expensive and bulky. Further, it doesn't make much sense to boot up a computer just to make a phone call.

Remote data collection devices with bar code and telephone interfaces include a variety of interfaces that are not necessary in an autodialer. These interfaces allow data collection and transmission via the phone line. Their inclusion increases the cost and complexity of use. Using bar codes to dial the phone is incidental if even possible.

Kessler, in U.S. Pat. No. 4,503,288, 1985, entitled "Intelligent Telephone", describes a system that has a keyboard with alphanumeric data entry keys, a one-line display, and a telephone handset included in all combinations disclosed. It also includes either an appliance control device or a voice synthesizer in all combinations disclosed. Alphanumeric data entry keys add unnecessary cost and complexity of use in an autodialer which reads phone numbers from bar code. A one-line display is an unnecessary cost as the phone number can be printed next to the bar code. Many users will already have a telephone which includes a handset and not wish the cost and clutter of an additional one. An autodialer is oriented towards outgoing calls and does not need to control local appliances or provide their status via synthesized voice. A device dedicated to the task of autodialing has sufficiently simple operation such that a voice synthesizer is unnecessary for user prompting.

DeAngelis, in U.S. Pat. No. 4,654,482, 1987, entitled "Home Merchandise Ordering Telecommunications Terminal", is designed for shopping via telephone. Bar codes are used to scan in merchandise part numbers. Means or a process for "conveying . . . electrical merchandise code signals" is included in all combinations disclosed. Use of bar codes for entering telephone numbers is not readily apparent. For use as an autodialer, conveying merchandise codes is not required and adds cost and complexity of use to the product.

Canuel, in U.S. Pat. No. 4,897,865, 1990, entitled "Telephone Data Collection Device", operates in a plurality of modes, including a data collection mode, a program mode, and a dial mode. Various input devices are available. Data entered can be put a variety of uses. The most important use is for transmission over the phone lines to another device. Dialing a number from a bar code requires first changing modes by scanning a different, special bar code. This complicates its usage as an autodialer. The sequence is described as follows: "Before dialing with the encoded telephone number, the user must first place the telephone data terminal in a dial mode by scanning an appropriate predefined encoded data sequence with bar code reader wand . . . In response to the predefined data sequence . . . enters the dial mode in which the next data sequence entered by the user through . . . input devices . . . is used by the telephone system to connect the telephone dialed." All versions disclosed specify this plurality of modes. The additional features, cost, and complexity of use make this inappropriate as a replacement for a traditional autodialer. "Calling Card" systems have their origins in machine-readable credit cards. As such, they are oriented more to factory-manufactured cards rather than user creation of a collection of phone numbers like traditional autodialers. They generally can store only one phone number per card. They may provide a variety of features in addition to the ability to a dial a number stored on the card, but these features increase the complexity of use.

Rhoads, in U.S. Pat. No. 4,817,136, 1989, entitled "Telephone Dialing System", describes a system using cards with a digitally encoded number on them. Although the preferred embodiment describes the encoding as a printed "bar code", the actual storage arrangement (FIG. 4) is a printed train of varying height pulses. This differs from what is generally described as a bar code in the automatic identification industry where a group of parallel stripes or actual bars are imprinted. In the preferred embodiment, the use of this pulse height code requires reading the card twice and then comparing the readings for verification. This increase in the time to dial a phone number may prove frustrating to the user. Double reading also increases the cost and complexity of the card reader if done automatically. Many standard bar codes are self checking and require only one reading.

Another disadvantage of a pulse height code is the precision required in the media and the reading device. The reading device must have its field of vision (in the height dimension) centered near the top of short pulses on the card. This field of vision must also be large enough to see that short pulses end below a certain height and that tall pulses continue above it. The reading mechanism and the printing on the card must be aligned such that this is true for any card inserted in any reading mechanism. This would probably require that cards be printed in large quantities in a factory where expensive equipment and tight quality control are available. It is difficult for the user to create such precisely printed cards on a personal computer system or a low cost dedicated unit. Duplication via office copier or fax may also not be accurate enough. This reading system is not capable of reading a card with a plurality of phone numbers on it or media in a non-card format, such as roster sheets, booklets, and labels affixed to other paperwork. Therefore, user creation of a personalized collection of phone numbers, like with traditional autodialers, will not be convenient.

The foregoing system must be configured before use by entering area codes that are local to the system. All cards have both the seven-digit telephone number and the three-digit area code on them. Thus the area code on the card being read is electronically compared with the area code of the system. If they match, it is a local call and the area code on the card is omitted during dialing. This requirement for system configuration (entry of local area codes) on each dialing system, especially in a home or office where a number of dialing systems are installed, can be a burden. Physical possession of each dialing system is required during its configuration. Many customer problems occur during system configuration and installation. This requires additional electronics solely for entering (keypad and decoding logic) and storing (EEPROM, battery backed up RAM, etc.) these local area codes. This will increase the cost and decrease the reliability of the system. Means for storing the system area code and means for comparing it to the card's area code are included in all version.

Tamaoki, in U.S. Pat. No. 4,868,849, 1989, entitled "Telephone Card and Telephone Card-Operated Telephone", shows in its preferred embodiment a card with both a telephone number printed in numerals and a magnetic area to record a count of the calls remaining. The count of calls remaining is apparently for billing purposes. The phone number is read by an Optical Character Recognition (OCR) device and then dialed, depending on other factors. Depending on which direction the card is inserted, the number will be automatically dialed or the user will dial manually. For use as a traditional autodialer, the call-remaining counting/billing feature is unnecessary. Without this feature, the ability to insert the card in a particular orientation to prevent autodialing is unnecessary and for use as an autodialer, self-defeating. All versions include this "predetermined enable means" for defeating autodialing. Thus, even in the simplest version, this system is more complicated than necessary for use as a traditional autodialer.

Objects and Advantages

Accordingly, several objects and advantages of our invention are to provide an improved automatic dialer system, an automatic dialer system which has simpler system-wide phone number entry and setup by allowing the user to enter phone numbers and most setup information once on a computer with extensive user conveniences, rather than on each cost-reduced autodialer unit.

Further objects and advantages are to provide an automatic dialer system in which the autodialer unit:

(a) allows reading a plurality of storage media and stacking the phone numbers to be later sequentially dialed;

(b) has reduced cost by use of readily available printing, scanning and decoding technology;

(c) does not require precise alignment with the storage media;

(d) lowers cost and complexity of use by not including interfaces and peripherals in the autodialer unit which are unnecessary for the basic task of autodialing;

(e) has simpler operation due to its minimal number of modes of operation; and (f) has simpler setup required at the installation of each autodialer unit, such as by not requiring entry of local area codes.

Additional objects and advantages are to provide an automatic dialer system in which the phone number storage media:

(a) are easily created, sorted, filed, copied, and distributed;

(b) can be created by one person (who requires only one device for creating a plurality of media) and be distributed to a plurality of autodialer users;

(c) allow one or a plurality of phone numbers per storage medium;

(d) simplify user creation of a collection of phone numbers like traditional autodialers, rather than being oriented more to factory-manufactured cards;

(e) allow an essentially unlimited maximum quality of stored numbers, limited only by the filing system used;

(f) are self checking and require only one reading;

(g) have a reduced cost by not including unnecessary features such as those which have their origins in machine readable credit cards, like magnetic tape; and (h) are easier to use and have less change for user error by not including unnecessary features such as "predetermined enable means" to inhibit autodialing under certain operating sequences.

Still further objects and advantages of out invention will become apparent from a consideration of the drawings and ensuing description.

List of Abbreviations

Figure 1:
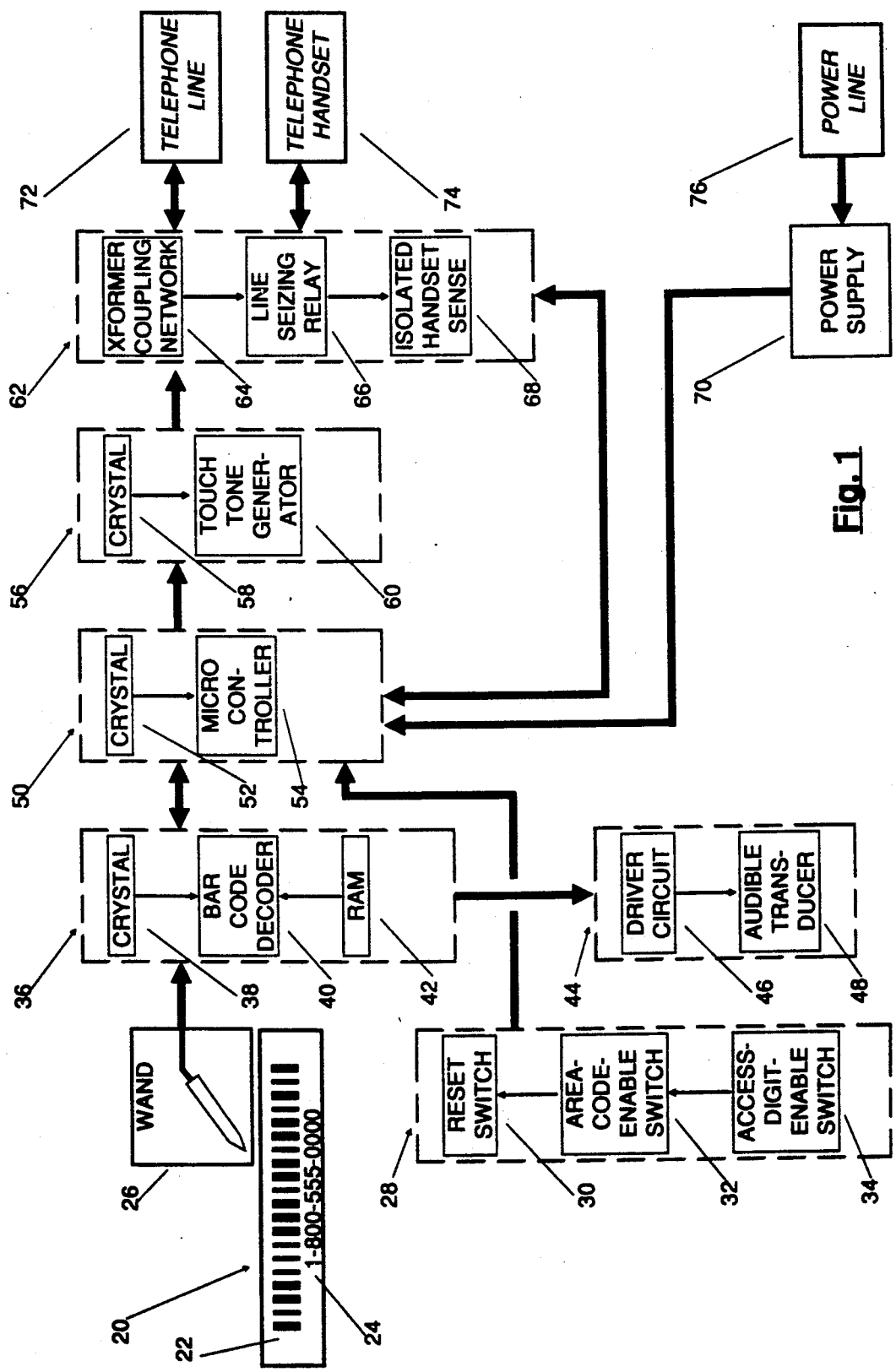
FIG. 1 shows a block diagram of a bar code autodialer. This embodiment user readily available components.

| | |
|---|---|
| AC | Alternating Current |
| A/D | Analog to Digital |
| ASCII | American Standard Code for Information Interchange |
| CPU | Central Processing Unit |
| D/A | Digital to Analog |
| DC | Direct Current |
| DTMF | Dual Tone MultiFrequency |
| IC | Integrated Circuit |
| I/O | Input/Output |
| OCR | Optical Character Recognition |
| RAM | Random Access Memory |
| ROM | Read Only Memory |

List of Reference Numerals

| | |
|---|---|
| 20 | Small bar code label |
| 22 | Bar code |
| 24 | Phone number |
| 26 | Bar code reading wand |
| 28 | User control |
| 30 | Reset switch |
| 32 | Area-code-enable switch |
| 34 | Access-digit-enable switch |
| 36 | Bar code decoder |
| 38 | Crystal |
| 40 | Bar code decoder IC |
| 42 | RAM IC |
| 44 | User prompt circuit |
| 46 | Driver circuit for audible transducer |
| 48 | Audible Transducer |
| 50 | Microcontroller |
| 52 | Crystal |
| 54 | Microcontroller IC |
| 56 | DTMF generation circuit |
| 58 | Crystal |
| 60 | DTMF generator IC |
| 62 | Isolated phone line interface circuit |
| 64 | Transformer coupling network |
| 66 | Line-seizing relay |
| 68 | Isolated handset sensor |
| 70 | Power Supply |
| 72 | Telephone line |
| 74 | Telephone handset |
| 76 | Power line |
| 78 | Crystal |
| 80 | Integrated control IC |
| 82 | CPU |
| 84 | RAM |
| 86 | ROM |
| 88 | Digital I/O interface |
| 90 | A/D converter |
| 92 | D/A converter |
| 94 | Non-isolated phone line interface circuit |
| 96 | Resistor/capacitor based coupling network |
| 98 | Line-seizing transistor |
| 100 | Non-isolated handset sensor |
| 102 | Line status sensor circuit (for dial tone, etc) |
| 104 | OCR label |
| 106 | OCR scanner |
| 108 | Computer |
| 110 | Software for printing bar code phone numbers and text |
| 112 | Printer |
| 114 | Printed media with bar codes and text |
| 116 | Dedicated bar code phone number printing unit |
| 118 | Keyboard |
| 120 | Large bar code label |

-continued

| 122 | Called party name and company |
| 124 | Rotary file card |
| 126 | Detailed information on called party |
| 128 | File folder |
| 130 | Various information on called party |
| 132 | Roster sheet |

DESCRIPTION

BAR CODE AUTODIALER AND STORAGE MEDIA (FIGS. 1,4–10)

Autodialer Unit Block Diagram

FIG. 1 shows a block diagram of a bar code autodialer using readily available components. This autodialer reads a bar code which represents a phone number, decodes it into the phone number, encodes the phone number into a sequence of DTMF signals, sends these signals on the public telephone network, and thus automatically dials the phone number.

A small bar code label 20 has a bar code 22 and a phone number 24 printed on it. Bar code 22 is scanned by a bar code reading wand 26 whose digital output signal indicates the pattern of black & white spaces on bar code 22. This signal goes to a bar code decoder 36.

Bar code decoder 36 consists of a bar code decoder IC 40, a crystal 38 for timing, and a Random Access Memory IC 42 for storage of data beyond the capacity of decoder IC 40. Decoder 36 sends an output signal to a user prompt circuit 44. Circuit 44 consists of a driver circuit 46 which is connected to an audible transducer 48 which audibly prompts the user of various operating conditions. Decoder 36 also sends an ASCII encoded bit-parallel, byte-serial representation of a complete phone number to a microcontroller 50.

Figure 11:
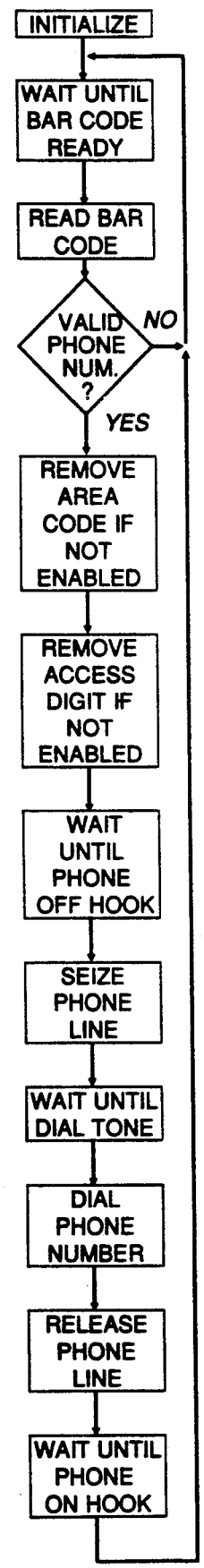
FIG. 11 shows a flow chart for a program for a bar code autodialer.

Microcontroller 50 consists of a microcontroller IC 54 and a crystal 52 for timing. IC 54 contains a program whose flow chart is shown in FIG. 11. Microcontroller 50 also receives digital input signals from a user control 28. User control 28 consists of a reset switch 30, an area-code-enable switch 32, and an access-digit-enable switch 34. Microcontroller 50 sends a digital-line-seizing signal to an isolated phone line interface circuit 62.

Microcontroller 50 also sends a bit-parallel, byte-serial digital representation of each digit to be dialed to a DTMF generation circuit 56. This representation is in the format generated by telephone keypads. DTMF circuit 56 consists of a DTMF generator IC 60 and a crystal 58 for timing. DTMF circuit 56 sends an analog signal in the standard telephone company DTMF format to interface 62.

Isolated phone line interface circuit 62 consists of a transformer coupling network 64 connected to a line-seizing relay 66 and an isolated handset sensor 68. Interface 62 connects to a telephone line 72 and a telephone handset 74. Network 64 provides DC isolation and AC coupling of the DTMF signal to line 72 for dialing purposes. Relay 66, when enabled by the digital-line-seizing signal from microcontroller 50, connects network 64 to line 72. Sensor 68 connects line 72 to handset 74. Sensor 68 also provides a digital on-hook/off-hook signal indicating the status of handset 74 to microcontroller 50. Sensor 68 provides DC isolation of digital on-hook/off-hook signal from line 72 and handset 74. DC power for the autodialer is provided by a power supply 70 which receives AC power from a power line 76. Power supply 70 also provides DC isolation of the autodialer from power line 76.

Equipment for Creation of Storage Media

Figure 4:
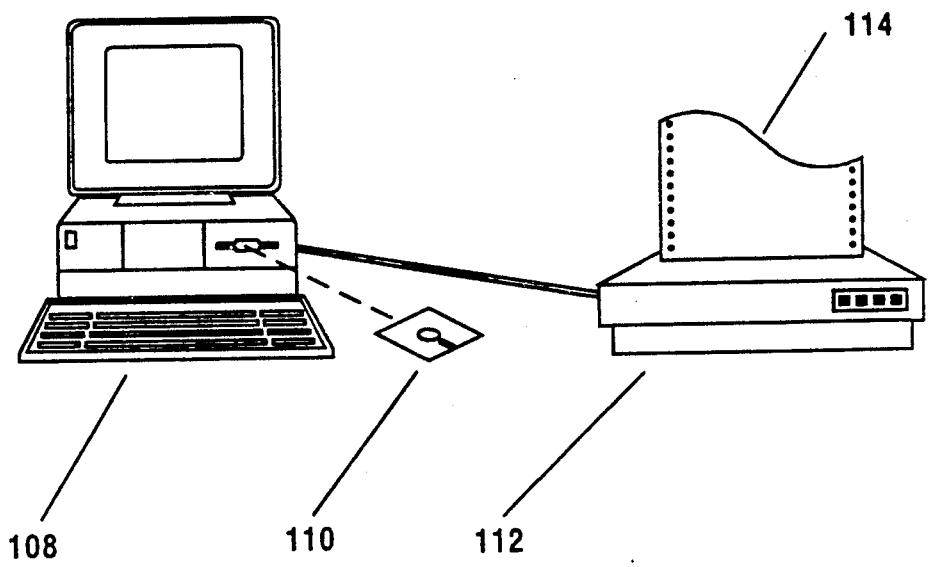
FIG. 4 shows a computer and printer configured with appropriate software to print bar code phone numbers in various formats.
Figure 13:
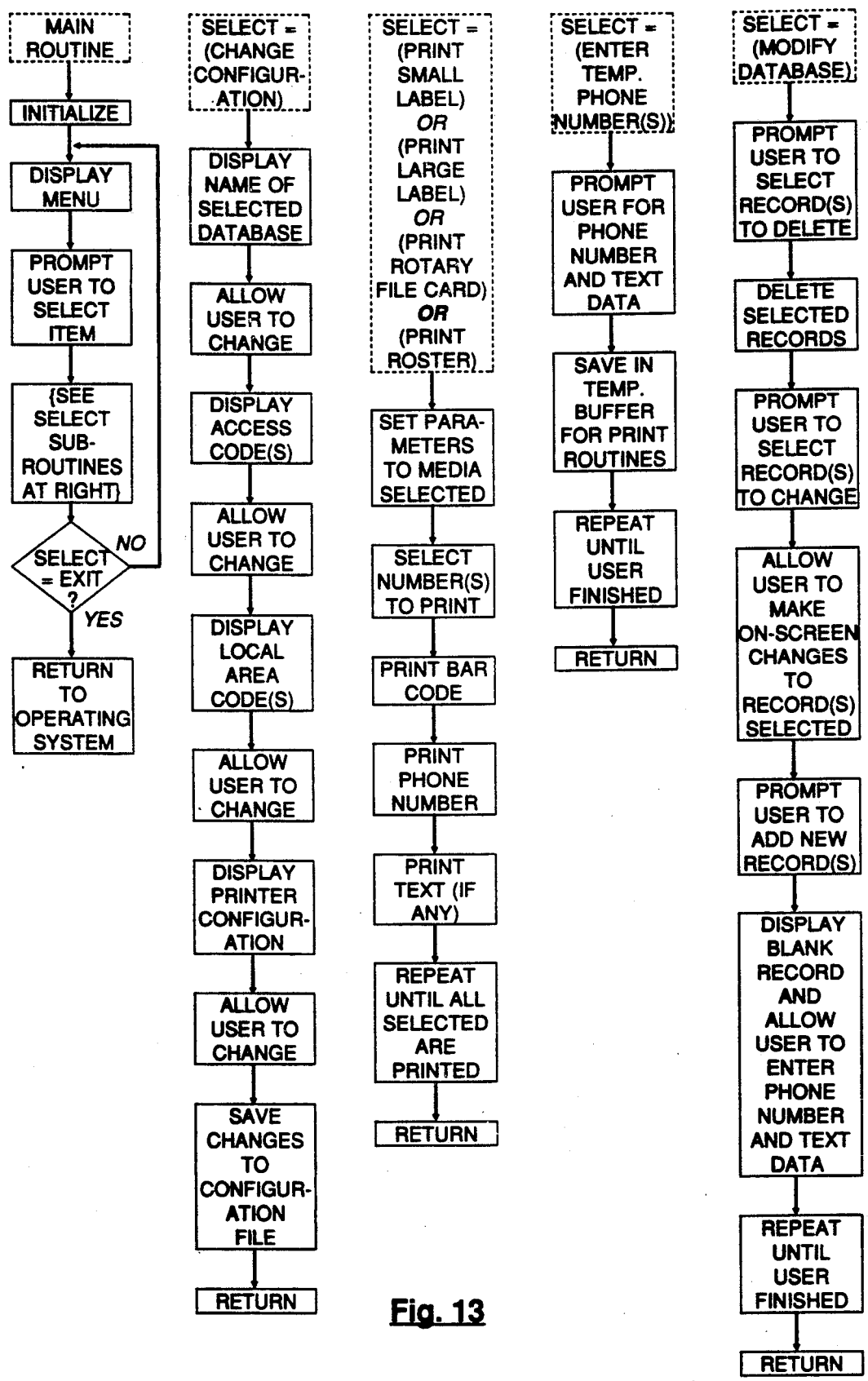
FIG. 13 shows a flow chart for a program for a computer to print various bar code phone numbers and text.

FIG. 4 shows a computer 108 connected to a printer 112. Computer 108 runs a software for printing bar code phone numbers and text 110. A flowchart of the software is shown in FIG. 13. Printer 112 generates a printed media with bar codes and test 114 which can be in various formats.

Figure 5:
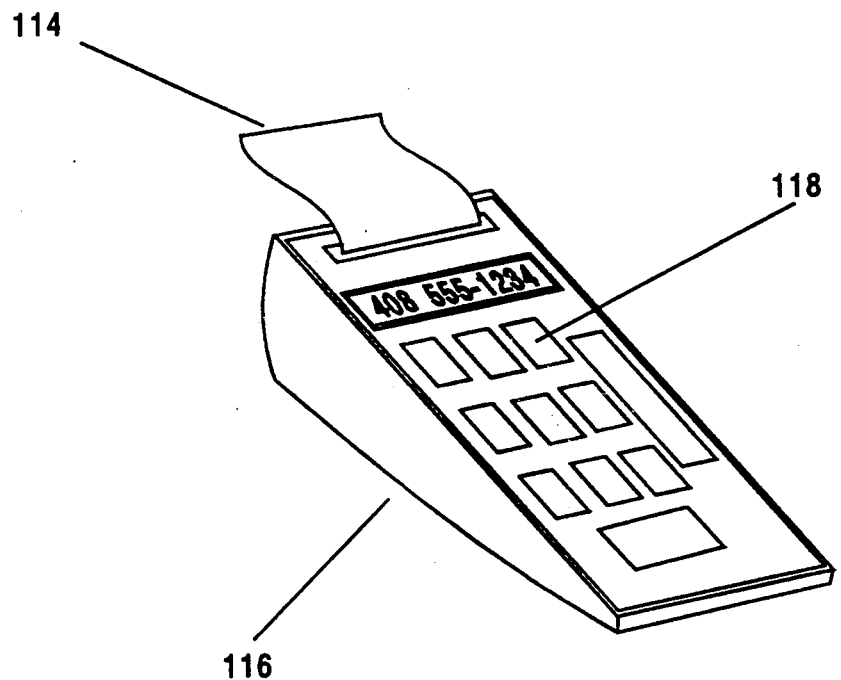
FIG. 5 shows a dedicated unit, similar to a printing calculator, for printing bar code phone numbers in various formats.

FIG. 5 shows a dedicated bar code phone number printing unit 116, similar to a printing calculator, which generates printed media with bar codes and test 114. Phone numbers and any other text information to be printed are entered by the user on a keyboard 118.

Storage Media Formats

Figure 6:
FIG. 6 shows a small label with bar code and phone number printed on it.
Figure 7:
FIG. 7 shows a large label with bar code, phone number, and other information on the called partly printed on it.

FIGS. 6 and 7 show labels. A variety of different sized labels with tractor feed strips for use with computer printers are widely available. More information can be printed on larger sizes. The label can be made of various types of paper or other materials and have an adhesive backing. FIG. 6 shows small bar code label 20 with bar code 22 and phone number 24 printed on it. FIG. 7 shows a large bar code label 120 with bar code 22, phone number 24, and a called party name and company 112 printed on it.

Figure 8:
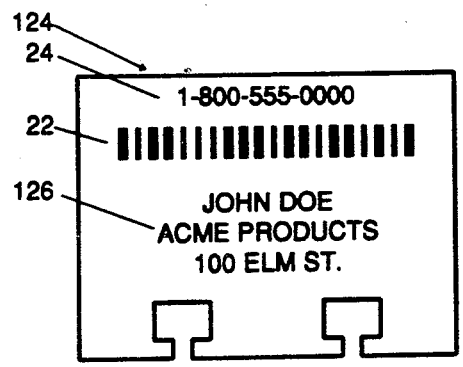
FIG. 8 shows a rotary file card with bar code, phone number, and other information on the called party printed on it.

FIG. 8 shows a rotary file card 124 with phone number 24, bar code 22, and a detailed information on called party 126 printed on it. Versions of card 124 with tractor feed strips for easy use with computer printers are widely available.

Figure 9:
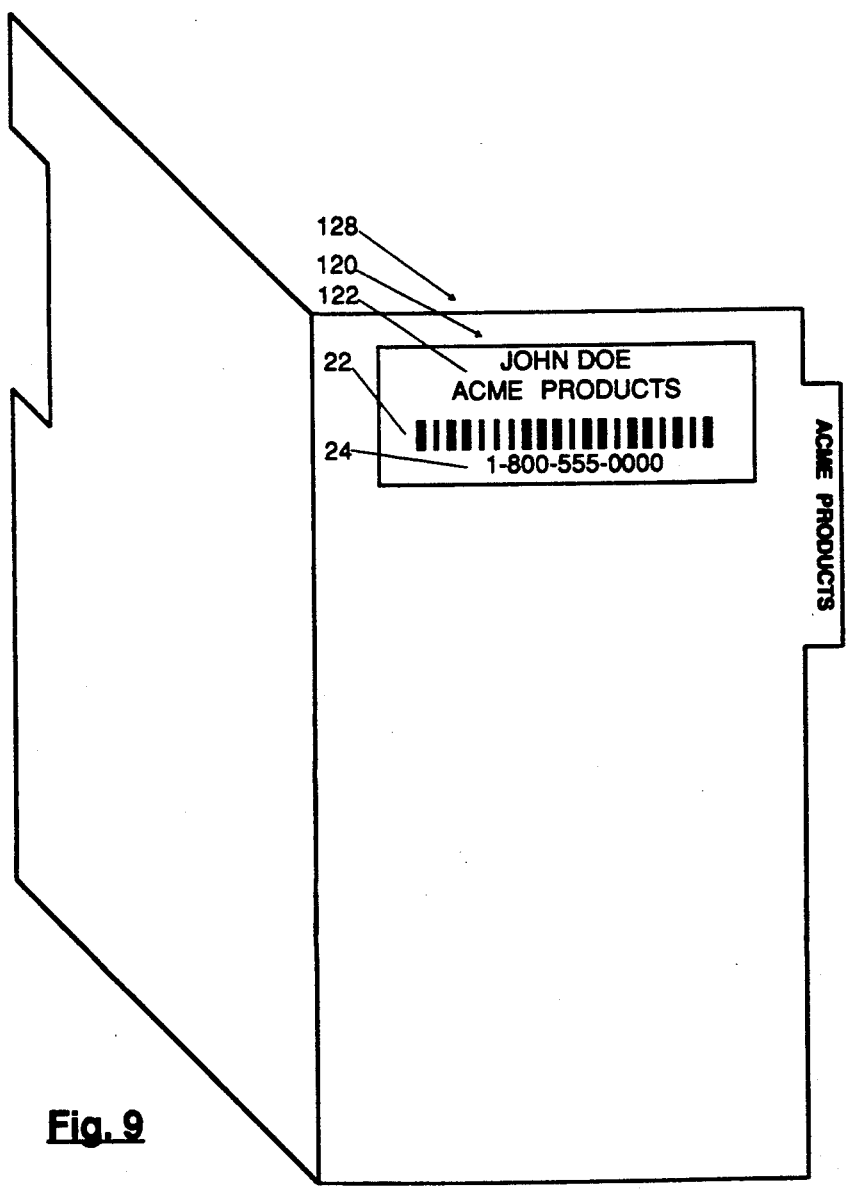
FIG. 9 shows a file folder which has affixed to it a large label with bar code, phone number, and other information on the called party printed on it.

FIG. 9 shows a large bar code label 120 affixed to a file folder 128. Any convenient size label can be affixed to any convenient surface of file folder 128.

Figure 10:
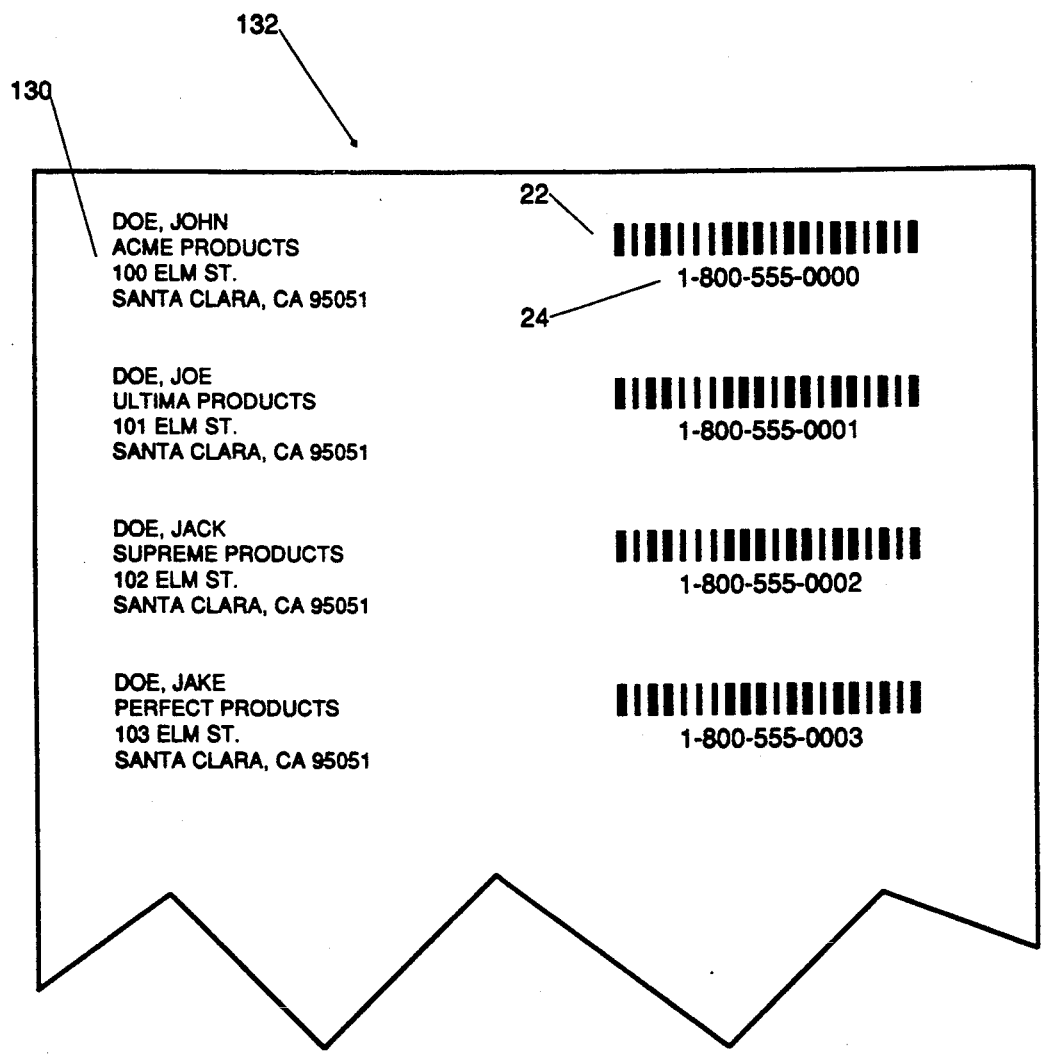
FIG. 10 shows a roster containing a plurality of bar codes, phone numbers, and other information on the called parties printed on it.

FIG. 10 shows a roster sheet 132 containing a plurality of entries each consisting of bar code 22, phone number 24, and a various information on called party 130 printed on it. Roster sheet 132 can be arranged in various formats and sizes, with sheets loose or bound.

Creation of Bar Code Storage Media

The first step in use of the bar code autodialer is creation of the phone number storage media. Access to a computer at office or home allows one to make bar code printouts easily. Referring to FIG. 4, the user connects computer 108 to printer 112. Software for printing bar code phone numbers and text 110 is run on computer 108.

When the system is used for the first time, configuration information is entered and saved to disk. The user selects a database file of phone numbers to be used. The user enters local area codes to be automatically deleted when bar code phone numbers are printed. Also entered are access codes (such as dial "9" for an outside line) to be automatically added during printing. Information on the printer type is also entered.

The user then follows the menu and enters phone numbers and other test such as name, company and address. The data is saved to disk for later use. The user selects the format for printing such as label (and size), rotary file card, or roster. The user selects which phone numbers to print. Printer 112 generates printed media with bar codes and test 114. Based on the format selected, the user can choose whether to have one or a plurality of phone numbers on a piece of storage medium.

An alternative technique is shown in FIG. 5 using dedicated bar code phone number printing unit 116, similar to a printing calculator. The user enters phone numbers on keyboard 118 and the unit generates printed media with bar codes and text 114.

Using the forgoing methods, the user can create a collection of phone numbers, like traditional autodialers, rather than be limited to factory manufactured cards. The user creates a low cost storage media from simple paper and ink, without unnecessary and costly features such as affixed magnetic tape.

Storage Media Distribution and Filing

Creating bar code storage media does not require physical possession of the autodialer. In an office it can be created by one person and distributed to a plurality of autodialer users. Distribution can be by hand, mail or fax. The phone numbers can also be sent by a modem or a floppy disk for printing elsewhere.

Duplication of the storage media (or phone number itself) for use on another automatic dialer can be easily done. Phone numbers printed via computer can be stored on disk for later reprinting and distribution to another autodialer. The storage media can be duplicated by an office copier or a commercial printer. The duplication of the storage media does not require possession of the source or destination autodialers.

The storage media's durability allows the user to distribute and file it without concern over stray magnetic field, x-rays, and electric power outage.

The storage media can use any of the various types of blank labels, cards and sheets available. This allows ease of sorting, filing and retrieving the storage media, particularly if its typical use is associated with other information. File folders with paper work on a client can have a bar code phone number label attached. Large rotary file card machines with customer and vendor data including phone numbers (often kept by wholesale suppliers, such as building materials or auto parts suppliers) can be printed with a bar code. The use of these filing and retrieving techniques allow an essentially unlimited maximum quantity of stored numbers.

Installation of the Autodialer Unit

The next step is installation of the autodialer unit. Area-code-enable switch 32 is set to enable position if all bar code phone number have only long distance area codes (but not local ones) printed with the rest of the number. This is the preferred method. If local area codes are printed, area-code-enable switch 32 is enabled when long distance calls are made and disabled for local ones. Access-digit-enable switch 34, if included, is set appropriately. This switch can have different embodiments. One embodiment has this switch include or delete printed access digit(s) scanned along with the rest of the phone number. An alternative embodiment has this switch add or not add specific access digit(s) which are associated with that switch. The preferred method is to have access digit(s) printed only if needed and not manipulated at the autodialer unit.

The autodialer is connected to telephone line 72 via standard connectors, such as RJ-11, the same way other telephone accessories are. Telephone handset 74 is connected to the autodialer in a similar fashion. Power supply 70 is plugged into power line 76. When power is applied, audible transducer 48 will give a confirming beep.

Dialing a Phone Number

Dialing is simple and straightforward since the user does not need to deal with unnecessary interfaces, peripherals, and excess modes of operation in the autodialer unit. The autodialer is placed near telephone handset 74 and the phone number storage media, such as small bar code label 20. The user enters a telephone number by sweeping bar code reading wand 26 across bar code 22 which represents phone number 24. There is a delay of about a second from the start of the sweep until the confirmation by audible transducer 48, indicating a correct entry.

The user reads the phone number with one sweep since standard bar code technology is self checking and thus does not require multiple readings for cross checking. The tip of wand 26 is kept between the upper and lower boundaries of bar code 22 during sweeping. It does not have to be precisely aligned or centered. Use is uncomplicated since there are no additional and unnecessary features on the storage media. The autodialer will dial the number when handset 74 is picked up (off-hook). If handset 74 is already off-hook when bar code 22 is scanned, dialing will be done immediately.

Handset 74 does not need to be off-hook during scanning. The user can scan first and then pick it up. The user can pick up handset 74 at a later time and the last entered telephone number will dial out. If the user plans on making calls to a plurality of persons, a plurality of telephone numbers can be scanned in one after another. Each time the user hands up handset 74 and picks it up again the next telephone number is dialed out (in the same order in which they were entered). The user can just press the hook switch button with a finger ("flash" the hook) instead of actually hanging up. The quantity of telephone numbers that can be stacked in advance of calling depends on the amount of RAM (item 42 or 84) used in the particular embodiment. Telephone numbers that have more than seven digits will lower the total quantity that can be stacked. By pressing reset switch 30 the stack of phone numbers is cleared.

DESCRIPTION

BAR CODE AUTODIALER (FIG. 2)

Block Diagram Description

Figure 2:
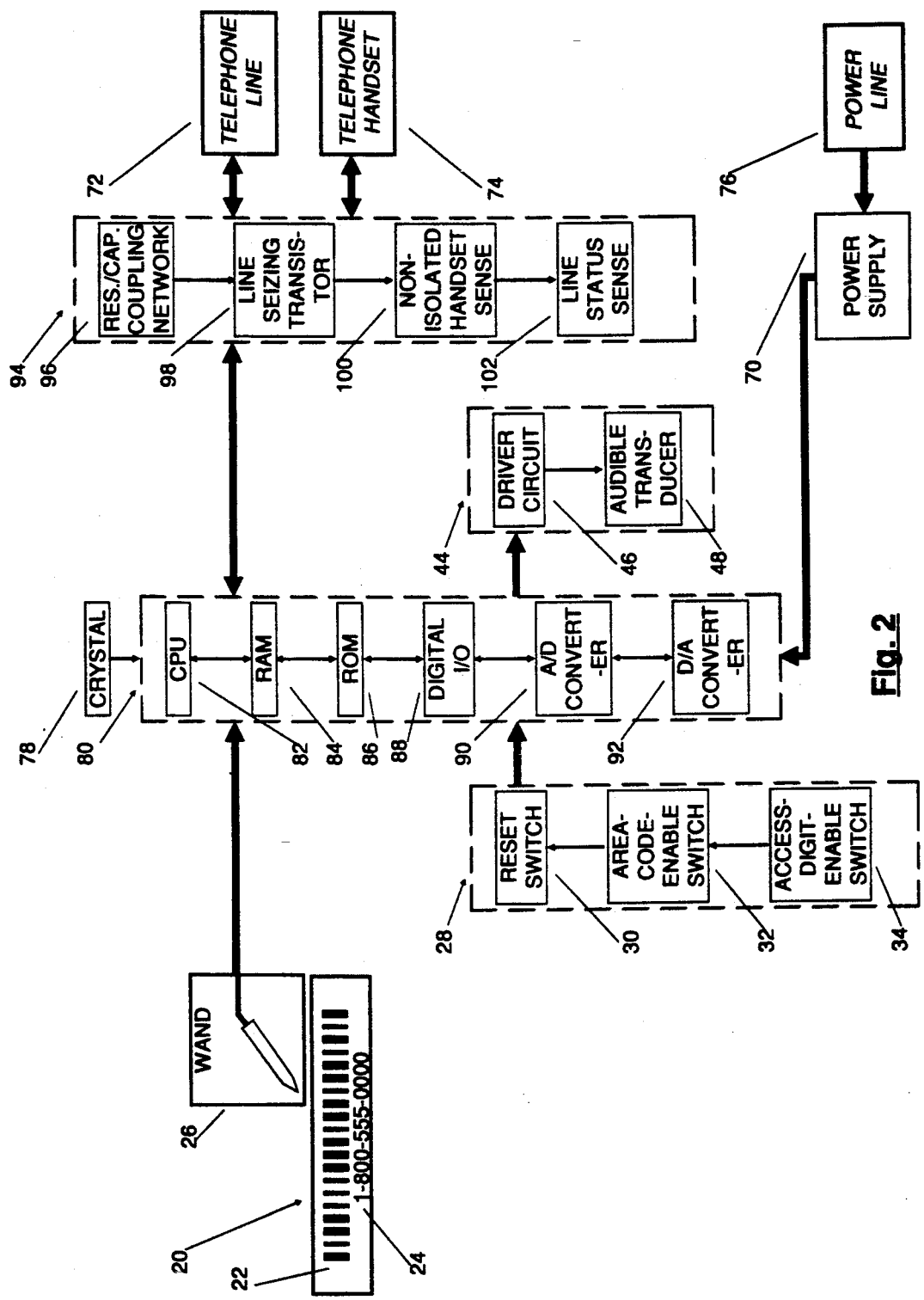
FIG. 2 shows a block diagram of a bar code autodialer. This embodiment user customized parts and is optimized for low cost.

FIG. 2 shown a block diagram of a bar code autodialer which uses customized parts, yet is optimized for low cost. This embodiment is the same as that of FIG. 1 up to and including the part where bar code reading wand 26 outputs the digital signal which indicates the pattern of black & white spaces on bar code 22. This signal in the embodiment of FIG. 2 goes to an integrated control IC 80. In FIG. 2, IC 80 provides the functions which are provided in FIG. 1 by bar code decoder 36, microcontroller 50 and DTMF generation circuit 56.

IC 80 contains a program whose flow chart is shown in FIG. 11. IC 80 receives timing from a crystal 78. IC 80 consists, on chip, of a CPU 82, a RAM 84 for data storage, a ROM 86 for program and constant storage, a Digital I/O interface 88, and an A/D converter 90, and a D/A converter 92. IC 80 also receives digital input signals from user control 28 described in the foregoing section for FIG. 1. Signals from user control 28 are processed by interface 88. IC 80 sends an output signal to user prompt circuit 44 which is described in the foregoing section for FIG. 1. Signals to user prompt circuit 44 may be generated by interface 88 or alternatively by D/A 92.

IC 80 also communicates with a non-isolated phone line interface circuit 94 which provides similar functions to isolated phone line interface circuit 62 except it does not provide DC isolation and is lower cost. Isolation of the user from telephone line 72 is provided by insulation barriers between the autodialer and the user. Interface 94 consists of a resistor/capacitor based coupling network 96, a line-seizing transistor 98, a non-isolated handset sensor circuit 100, and a line status sensor circuit 102. Interface 94 connects to telephone line 72 and telephone handset 74.

Resistor/capacitor based coupling network 96 provides impedance matching and coupling of the DTMF signal to line 72 for dialing purposes. Line-seizing transistor 98, when enabled by the digital-line-seizing signal from IC 80, connects network 96 to line 72.

Non-isolated handset sensor 100 connects line 72 to handset 74. Sensor 100 also provides an analog on-hook/off-hook signal indicating the status of handset 74 to IC 80 where it is processed by A/D 90.

Line status sensor circuit 102 provides a signal to IC 80 where it is processed by A/D 90. This signal allows IC 80 to determine line status such as whether there is a dial tone.

DC power for the autodialer is provided by power supply 70 which receives AC power from a power line 76. Power supply 70 also provides DC isolation of the autodialer, telephone line 72, and handset 74 from power line 76.

Use of the Autodialer

The bar code autodialer of FIG. 2 has the same operation from the suer point of view as the bar code autodialer of FIG. 1. Differences are internal to the units and not visible to the user. See the foregoing section on the bar code autodialer of FIG. 1.

DESCRIPTION
OCR AUTODIALER (FIG. 3)

Block Diagram Description

Figure 3:
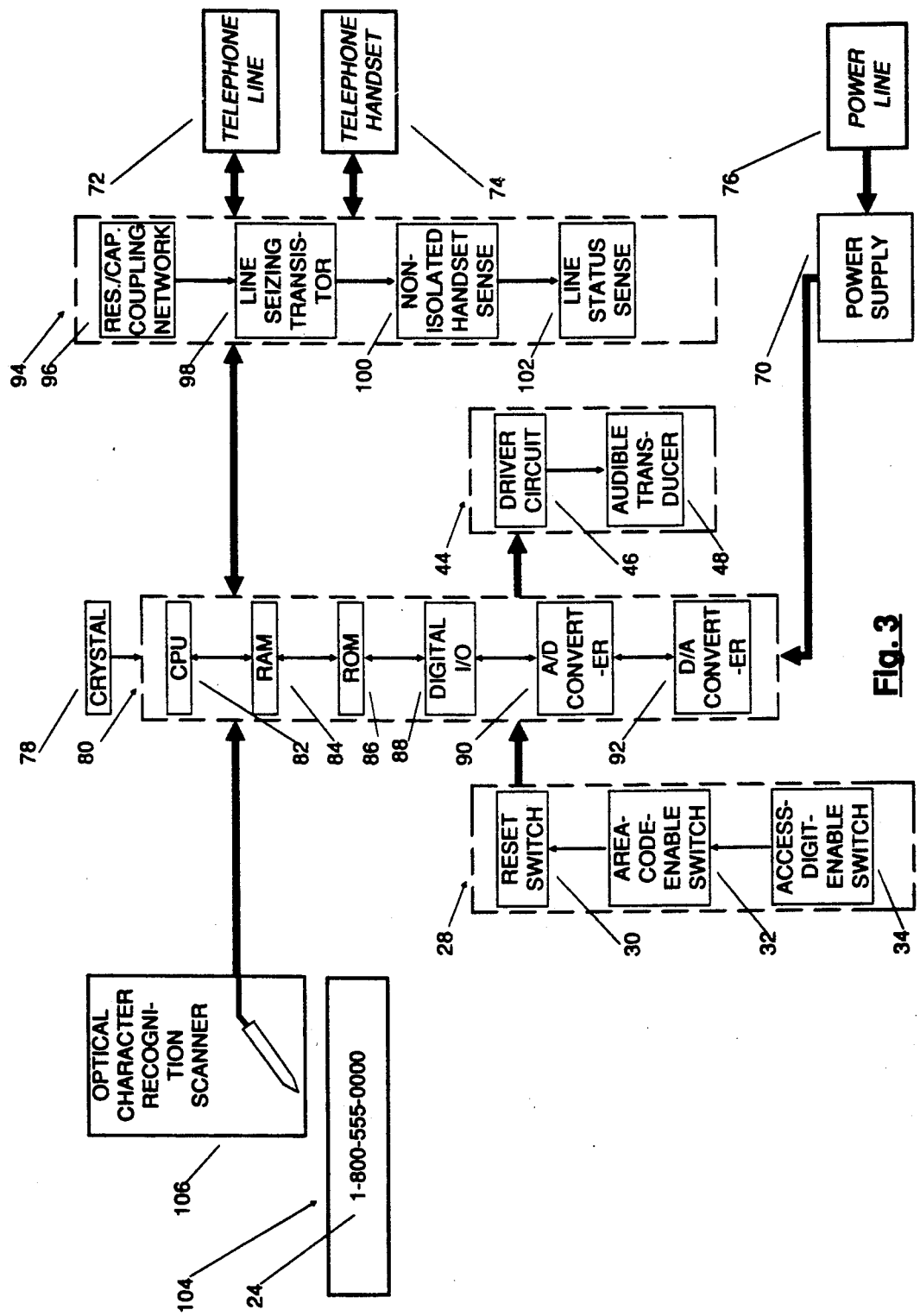
FIG. 3 shows a block diagram of an Optical Character Recognition (OCR) autodialer.
Figure 12:
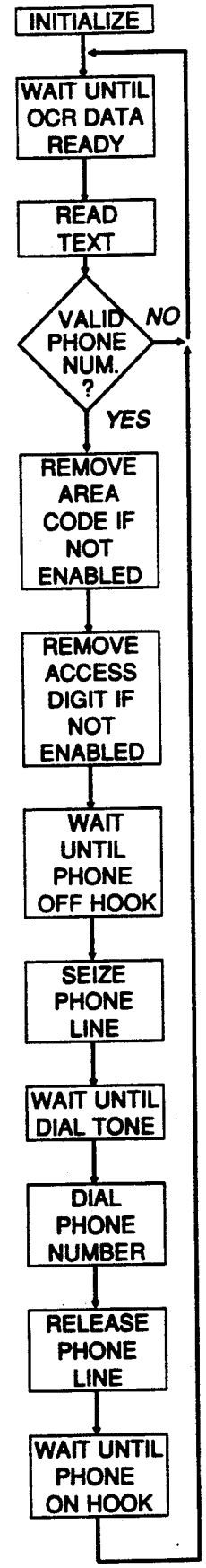
FIG. 12 shows a flow chart for a program for an OCR autodialer.

FIG. 3 shown a block diagram of an OCR autodialer. An OCR label 104 with phone number 24 is scanned by an OCR scanner 106. Scanner 106 sends a signal to integrated control IC 80 which indicates optically recognized characters. Alternatively this signal could represent a black and white raster of dots representing phone number 24 with the conversion to actual characters done by IC 80. This embodiment is the same as that of FIG. 2 in terms of hardware after the part where IC 80 receives the scanned input. Different firmware is required. IC 80 contains a program whose flow chart is shown in FIG. 12.

Use of the Autodialer

When the OCR autodialer is used, creation of bar code based storage media is obviously not required. The set up of the autodialer is similar to that described in the foregoing section for the bar code autodialer of FIG. 1. The OCR autodialer can recognize and dial actual printed phone numbers. The user scans in phone numbers out of a phone directory, letterhead, typed phone number lists, rotary file cards, business cards, or any place where there is a printed phone number. Other aspects of operation are the same as described in the foregoing section for the bar code autodialer of FIG. 1.

DESCRIPTION
FLOW CHARTS (FIGS. 11-13)

FIG. 11 shown a flow chart of a program for a bar code autodialer. This is the firmware used in microcontroller IC 54 of FIG. 1 and integrated control IC 80 of FIG. 2.

FIG. 12 shown a flow chart for a program for an OCR autodialer. This is the firmware used in IC 80 in FIG. 3.

FIG. 13 shown a flow chart for a program used in FIG. 4 by computer 108 which is connected to printer 112. This program is represented in FIG. 4 by a computer disk containing software for printing bar code phone numbers and text 110. When this program is run, printer 112 generates printed media with bar codes and text 114 which can be in various formats.

CONCLUSION, RAMIFICATIONS, AND SCOPE OF INVENTION

Thus the reader will see that autodialer of the invention provides a convenient and flexible device for dialing phone numbers. This is shown by its ease of entering the phone number to the storage media, ease of recall of the phone number for dialing, ease of duplicating the storage media (or phone number itself) for use on another automatic dialer via printing additional copies or duplication via office copier, durability of the storage media, ease of sorting, filing and retrieving the storage media, particularly if its typical use is associated with other information, essentially unlimited maximum quantity of stored numbers, not requiring a bulky computer on the desk of each person doing autodialing, not including unnecessary, costly interfaces and peripherals on the autodialer, simplicity of operation by minimizing the number of modes of operation, simplicity of user creation of a collection of phone numbers like traditional autodialers rather than being oriented more to factory manufactured cards, allowing the user the choice of having one or a plurality of phone numbers stored per piece of storage medium, capability to read a plurality of storage media and stack the phone numbers to be later sequentially dialed;

use of standard, readily available bar code technology, use of a phone number storage method which is self checking and requires only one reading, use of a phone number storage method which does not require precise alignment between the reader and the storage media, minimization of setup and configuration required during autodialer installation, and not requiring features on the phone number storage media that increase its cost or complexity of use.

Thus the scope of the invention should be determined by the appended claims and their legal equivalents, rather than by the examples given.

We claim:

1. An automatic telephone dialer system for use with a telephone which can have an on-hook or off-hook status, comprising:

(a) printed storage means for storing at least one telephone number in a printed format, whereby said printed storage means can be easily filed and duplicated, (b) reading means for reading said printed storage means and converting said telephone number into a telephone-number-representative electrical signal, (c) processor means for processing said electrical signal into a signal suitable for dialing a telephone, (d) interface means for interfacing said processor means to a telephone line, (e) sensor means for sensing whether said telephone has an on-hook or off-hook status, (f) means for connecting said sensor means to said processor means so that the phone number read by said reading means is not dialed by said processor means until said sensor means senses that said telephone has an off-hook status, (g) memory means for storing a plurality of phone numbers in response to said telephone-number-representative electrical signal from said reading means, such that said phone numbers in said memory means have a sequence of storage, and that said telephone-number-representative electrical signal from said reading means has a sequence of reading, such that said sequence of storage and said sequence of reading are identical, (h) means for connecting said memory means to said processor means so that one of said phone numbers in said memory means is dialed by said processor means each time said telephone makes an on-hook to off-hook transition, such that said phone numbers dialed by said processor means have a sequence of dialing which is identical to said sequence of storage and said sequence of reading, and (i) reset switch means connected to said processor means so that upon activation of said reset switch means, all phone numbers are deleted from said memory means.

2. The automatic telephone dialer system of claim 1 wherein said printed storage means is a bar code comprising a plurality of parallel stripes and said reading means is capable of decoding said bar code.

3. The automatic telephone dialer system of claim 2 wherein said bar code is printed on a stick-on label.

4. The automatic telephone dialer system of claim 3 wherein said stick-on label is also printed with a telephone-number-representative text and a called-party-information-representative text.

5. The automatic telephone dialer system of claim 2 wherein said bar code is printed on a card suitable for filing, and said card is also printed with a telephone-number-representative text and a called-party-information-representative text.

6. The automatic telephone dialer system of claim 2 wherein a plurality of said bar codes are printed on a roster sheet, and for each of said bar codes said roster sheet is also printed with a telephone-number-representative text and a called-party-information-representative text.

7. The automatic telephone dialer system of claim 2, further including switch means connected to said processor means for inhibiting the dialing by said processor means of an area code contained in said printed storage means.

8. The automatic telephone dialer system of claim 2, further including switch means connected to said processor means for inhibiting the dialing by said processor means of an access code contained in said printed storage means.

9. The automatic telephone dialer system of claim 2, further including (a) computing means which includes a display screen and a keyboard for user entry of data such as setup, phone numbers, and text, nonvolatile storage means for storing said data and a program, and said program that contains instructions for controlling said screen, said keyboard and said storage means, and (b) printing means for generating said printed storage means in a variety of formats under control of said computing means.

10. The automatic telephone dialer system of claim 1 wherein said printed storage means stores said telephone number in a humanly-readable format, and said reading means is capable of reading said format.

11. The automatic telephone dialer system of claim 10, further including switch means connected to said processor means for inhibiting dialing by said processor means of an area code contained in said printed storage means.

12. The automatic telephone dialer system of claim 10, further including switch means connected to said processor means for inhibiting dialing by said processor means of an access code contained in said printed storage means.

13. An automatic telephone dialer system for use with a telephone which can have an on-hook or off-hook status, comprising:

(a) printed storage means for storing at least one telephone number in a printed format, whereby said printed storage means can be easily filed and duplicated, (b) computing means which includes a display screen and a keyboard for user entry of data such as setup, phone numbers, and text, nonvolatile storage means for storing said data and a program, and said program that contains instructions for controlling said screen, said keyboard and said storage means, (c) printing means for generating said printed storage means in a variety of formats under control of said computing means, (d) reading means for reading said printed storage means and converting said telephone number into a telephone-number-representative electrical signal, (e) processor means for processing said electrical signal into a signal suitable for dialing a telephone, (f) interface means for interfacing said processor means to a telephone line, (g) sensor means for sensing whether said telephone has an on-hook or off-hook status, (h) means for connecting said sensor means to said processor means so that the phone number read by said reading means is not dialed by said processor means until said sensor means senses that said telephone has an off-hook status, (i) memory means for storing a plurality of phone numbers in response to said telephone-number-representative electrical signal from said reading means, such that said phone numbers in said memory means have a sequence of storage, and that said telephone-number-representative electrical signal from said reading means has a sequence of reading, such that said sequence of storage and said sequence of reading are identical, (j) means for connecting said memory means to said processor means so that one of said phone numbers in said memory means is dialed by said processor means each time said telephone handset connected to said sensor means makes an on-hook to off-hook transition, such that said phone numbers dialed by said processor means have a sequence of dialing which is identical to said sequence of storage and said sequence of reading, and (k) reset switch means connected to said processor means so that upon activation of said reset switch means, all phone numbers are deleted from said memory means.

14. The automatic telephone dialer system of claim 13 wherein said printed storage means is a bar code comprising a plurality of parallel stripes and said reading means is capable of decoding said bar code.

15. The automatic telephone dialer system of claim 14, further including switch means connected to said processor means for inhibiting the dialing by said processor means of an area code contained in said printed storage means.

16. The automatic telephone dialer system of claim 15, further including switch means connected to said processor means for inhibiting the dialing by said processor means of an access code contained in said printed storage means.

17. The automatic telephone dialer system of claim 16 wherein said bar code is printed on a stick-on label.

18. The automatic telephone dialer system of claim 17 wherein said stick-on label is also printed with a telephone-number-representative text and a called-party-information-representative text.

19. The automatic telephone dialer system of claim 16 wherein said bar code is printed on a card suitable fir filing, and said card is also printed with a telephone-number-representative text and a called-party-information-representative text.

20. The automatic telephone dialer system of claim 16 wherein a plurality of said bar codes are printed on a roster sheet, and for each of said bar codes said roster sheet is also printed with a telephone-number-representative text and a called-party-information-representative text.

* * * * *